United States Patent [19]
Masleid

[11] Patent Number: 5,646,572
[45] Date of Patent: Jul. 8, 1997

[54] POWER MANAGEMENT SYSTEM FOR INTEGRATED CIRCUITS

[75] Inventor: Robert Paul Masleid, Austin, Tex.

[73] Assignee: International Business Machines Corporation, Armonk, N.Y.

[21] Appl. No.: 708,391

[22] Filed: Sep. 4, 1996

Related U.S. Application Data

[63] Continuation of Ser. No. 377,912, Jan. 25, 1995, abandoned.

[51] Int. Cl.[6] .................................................... H02J 1/02
[52] U.S. Cl. .......................... 327/545; 327/143; 327/546
[58] Field of Search .................................... 327/143, 198, 327/545, 546; 361/54, 56, 118

[56] References Cited

U.S. PATENT DOCUMENTS

| | | | |
|---|---|---|---|
| 3,549,612 | 12/1970 | Gately | 327/310 |
| 3,609,517 | 9/1971 | Tucker | 327/456 |
| 3,646,439 | 2/1972 | Broski | 327/514 |
| 4,367,422 | 1/1983 | Leslie | 327/143 |
| 4,586,179 | 4/1986 | Sirazi et al. | 371/12 |
| 4,849,661 | 7/1989 | Bazes | 326/71 |
| 4,893,029 | 1/1990 | Matsuo et al. | 327/546 |
| 4,900,951 | 2/1990 | Saito et al. | 327/545 |
| 5,109,166 | 4/1992 | Coburn et al. | 327/129 |
| 5,175,845 | 12/1992 | Little | 395/550 |
| 5,203,000 | 4/1993 | Folkes et al. | 395/750 |
| 5,243,231 | 9/1993 | Baik | 327/545 |
| 5,243,232 | 9/1993 | Bolda et al. | 327/545 |
| 5,267,197 | 11/1993 | McClure | 365/189.01 |
| 5,271,023 | 12/1993 | Norman | 371/68.3 |
| 5,303,390 | 4/1994 | Little | 395/575 |
| 5,455,534 | 10/1995 | Motegi et al. | 327/546 |

FOREIGN PATENT DOCUMENTS

| | | | |
|---|---|---|---|
| 0430671A2 | 6/1991 | European Pat. Off. . | |
| 3-107333 | 5/1991 | Japan | 327/545 |
| 4-123797 | 4/1992 | Japan | 327/545 |
| 4-364328 | 12/1992 | Japan | 327/543 |

OTHER PUBLICATIONS

IBM Technical Disclosure Bulletin, vol. 32, No. 3B, Aug., 1989 pp. 403–407.
IBM Technical Disclosure Bulletin, vol. 31, No. 1, Jun., 1988 pp. 95–97.
IBM Technical Disclosure Bulletin, vol. 28, No. 1, Jun., 1985 pp. 421–425.
IBM Technical Disclosure Bulletin, vol. 27, No. 2, Jul., 1984 pp. 1193–1194.
IBM Technical Disclosure Bulletin, "Low Loss–Type Starter Circuit For Switching Mode Power Supply", Oct. 88, pp. 424–425.

*Primary Examiner*—Terry Cunningham
*Attorney, Agent, or Firm*—Benman Collins & Sawyer; Michael A. Davis, Jr.

[57] ABSTRACT

A system for controlling the application of power by a power supply to a load. The inventive system includes a first circuit for drawing power from the power supply and a second circuit for controlling the amount of power drawn by the first circuit from the power supply. The amount of power drawn from the power supply is gradually increased prior to the application of power to the load and gradually decreased after removal of power from the load. In the illustrative embodiment, the first circuit is a digitally controlled resistance and the second circuit is a digital counter which supplies a control word for the digitally controlled resistance. A high order bit from the counter enables the gating of clock pulses to the load circuit. As a result, activation of the load circuit is delayed while the invention gradually varies the amount of power drawn from the power supply to a desired threshold level. The gradual draw of power from the supply significantly mitigates transients ordinarily associated with the application of clock pulses to a load circuit at machine startup or removal of clock pulses at machine shutdown.

11 Claims, 3 Drawing Sheets ates to electronic circuits. More
POWER MANAGEMENT SYSTEM FOR INTEGRATED CIRCUITS This Application is a continuation of Ser. No. 08/377, 912, filed Jan. 25, 1995, now abandoned.

FIELD OF THE INVENTION

The present invention relates to electronic circuits. More specifically, the present invention relates to circuits and systems for supplying power to very large scale integrated circuits (VLSI).

BACKGROUND OF THE INVENTION

Power supplies for integrated circuits (ICs) include inductive elements which generate transients due to machine startup, particularly clock start and clock stop.

The transients manifest as noise which is unacceptable for certain applications. The problem is particularly acute in high performance VLSI chips.

The conventional solution is to use large decoupling capacitors between the power supply and ground. These capacitors must be supplied on the chip or off the chip. On-chip capacitors are expensive to implement and consume valuable die area. Off-chip capacitors are not as effective.

A second conventional approach to the problem involves the use of resistors between the power supply and the load. However, this often results in a degradation of voltage regulation.

Thus, there is a need in the art for a system or technique for mitigating power supply transients on the application of power to integrated circuits.

SUMMARY OF THE INVENTION

The need in the art is addressed by the present invention which provides a system for controlling the application of power by a power supply to a load. The inventive system includes a first circuit for drawing power from the power supply and a second circuit for controlling the amount of power drawn by the first circuit from the power supply. The amount of power drawn from the power supply is gradually increased prior to the application of power to the load and gradually decreased after removal of power from the load.

In the illustrative embodiment, the first circuit is a digitally controlled resistance and the second circuit is a digital counter which supplies a control word for the digitally controlled resistance. A high order bit from the counter enables the gating of clock pulses to the load circuit. As a result, activation of the load circuit is delayed while the invention gradually varies the amount of power drawn from the power supply to a desired threshold level. The gradual draw of power from the supply significantly mitigates transients ordinarily associated with the application of clock pulses to a load circuit at machine startup or removal of clock pulses at machine shutdown.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
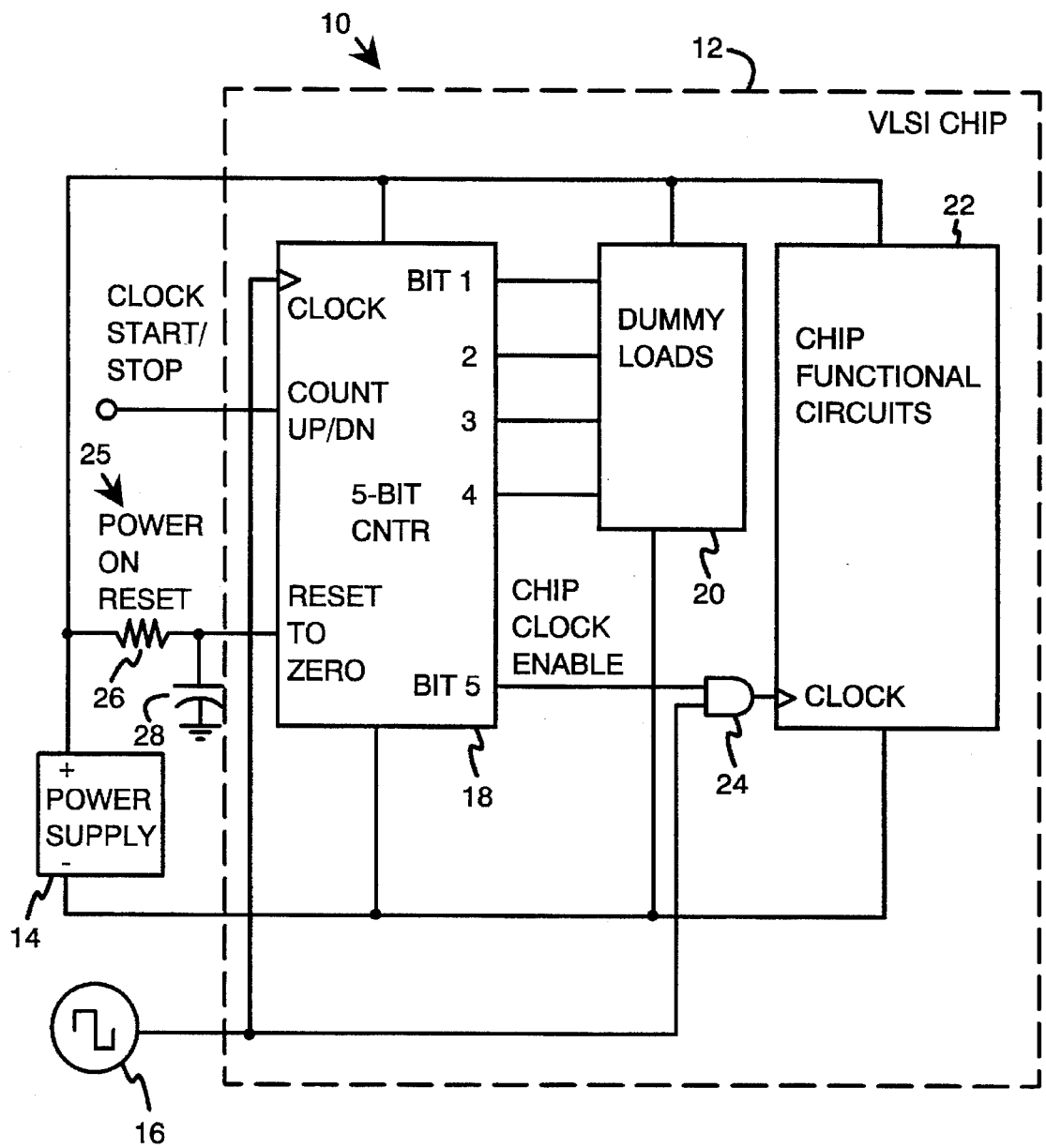
FIG. 1 is a block diagram of an illustrative implementation of the system for controlling the application of power by a power supply to a load of the present invention.

FIG. 1 is a block diagram of an illustrative implementation of the system for controlling the application of power by a power supply to a load of the present invention. The overall circuit 10 includes a VLSI chip 12 on which the present invention is implemented. The VLSI chip 12 is connected to a conventional power supply 14 and a clock 16. Power is supplied to the chip 12 via a conventional RC filter 25 including a resistor 26 and a capacitor 28. A clock start/stop signal is supplied to the chip 12 by a controlling device (not shown).

In accordance with the present teachings, power from the power supply, the clock and the clock stop/start signals are applied to a counter 18 implemented in the illustrative embodiment on chip as five bit counter. When these signals are applied, the counter 18 begins to count clock pulses up or down depending on the value of the clock stop start signal. A typical count sequence is illustrated below:

---
00000
00001
00010
00011
00100
00110
00111
01000
01001
01010
01011
01100
01101
01110
01111
10000
---

In accordance with the present teachings, a selected set of these outputs from the digital counter 18 are used to vary the resistance of a dummy load 20 implemented, in the illustrative embodiment, as a digitally controlled resistance. As shown in FIG. 1, the dummy loads are connected in parallel with the power supply 14 and the chip functional circuits 22.

Figure 2:
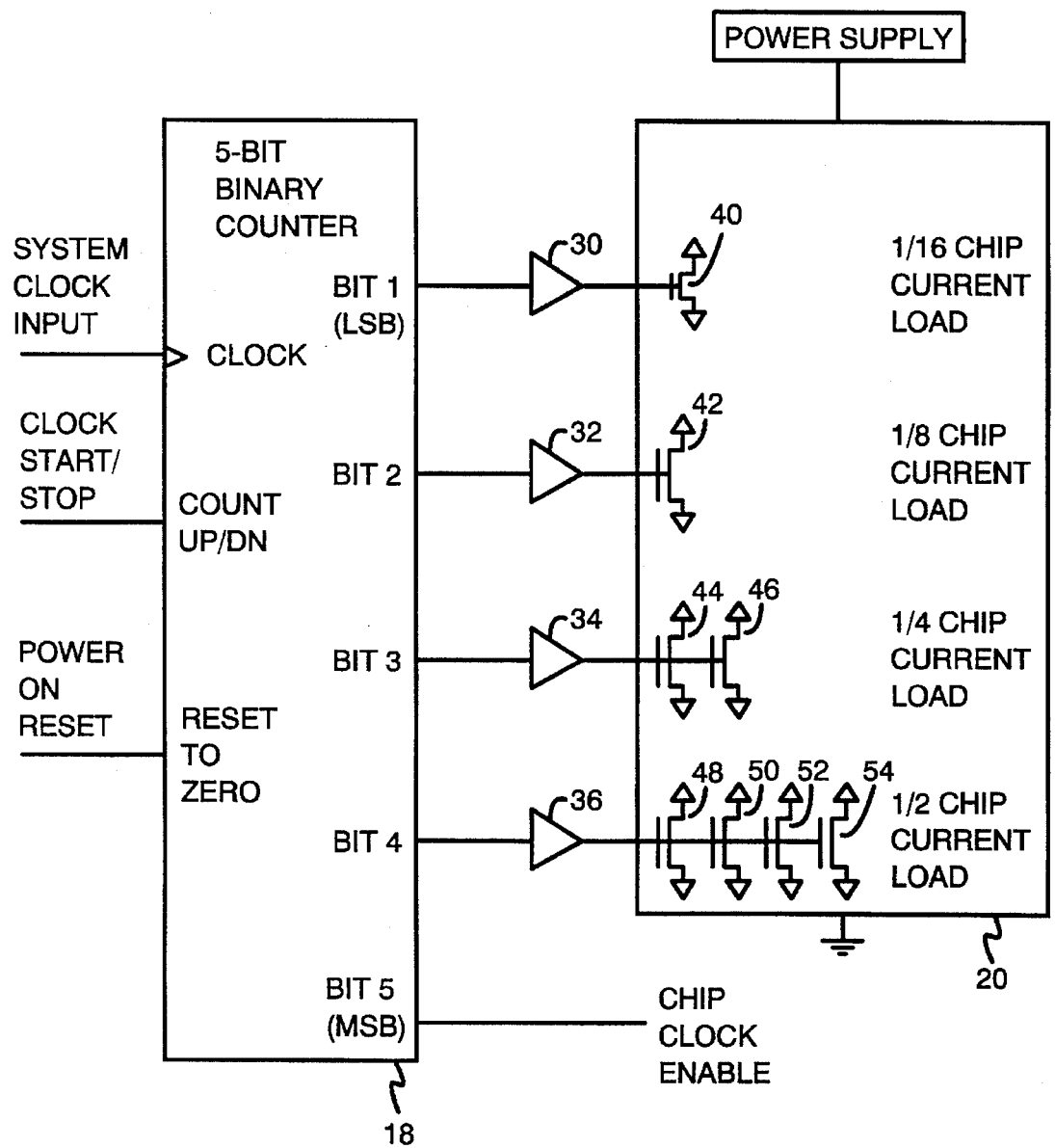
FIG. 2 is a schematic diagram of the dummy load of the system depicted in FIG. 1.

FIG. 2 is a schematic diagram of the dummy load 20. In accordance with the invention, four outputs from the counter 18 are used to control the dummy load 20. An additional output is used to gate the clock in the chip functional circuits 22 via an AND gate 24 in the manner described more fully below.

As the counter counts up or down through the sequence illustrative above, various combinations of resistors are activated via a plurality of buffer amplifiers 30, 32, 34 and 36. In the illustrative embodiment the resistive elements are implemented with transistors 40–54 (even numbers only). Thus, the least significant bit of the counter is connected to the gate of a first transistor 40 which, in the illustrative embodiment, is sized to draw 1/16th the nominal steady state current ordinarily drawn by the chip functional circuits 22. Bit 2 from the counter 18 is connected to the gate of a second transistor 42 which is sized to draw 1/8th of the chip 5 current.

Bit 3 from the counter is connected to the gates of third and fourth transistors 44 and 46 which are sized to draw in combination ¼th the chip current and bit 4 is connected to the gates of fifth, sixth, seventh and eighth transistors 48, 50, 52 and 54, respectively, which are sized to draw, in combination, ½ the nominal chip current.

Switching transients due to the switching of the dummy load transistors may be expected to be comparable to the cycle-to-cycle transients inside the functional circuits 22 and may be addressed in a conventional manner if necessary.

Figure 3:
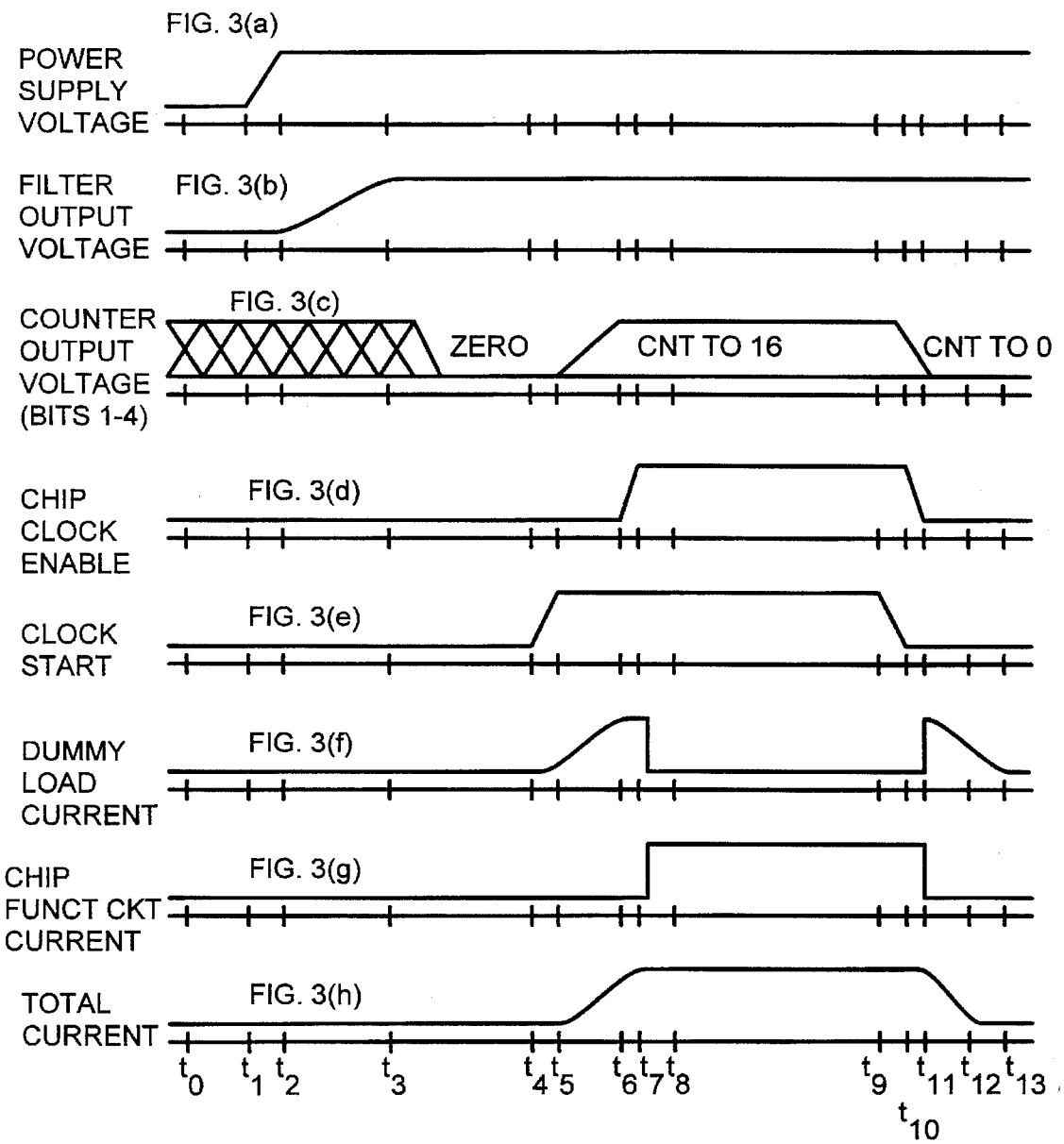
FIG. 3 shows timing diagrams illustrative of the operation of the system of the present invention.

FIG. 3 shows timing diagrams illustrative of the operation of the system of the present invention. At power on (t1, the power supply is on (FIG. 3(a)) and at t2, the RC filter 25 output voltage begins to rise. At t3, the filter 25 output voltage reaches a maximum and provides a reset to zero signal for the counter 18 (FIG. 3(b)). Hence, the counter output is subsequently reset to zero (FIG. 3(c)). At this point, bits 1–5 of the counter 18 are set at zero. Hence, all loads are shut down and the 'chip clock enable' signal of FIG. 3(d) is low. The chip current demand (FIG. 3(g)) and total current demanded of the power supply (FIG. 3(h)) are both close to zero. FIG. 3(g) shows that the functional circuits 22 draw minimal current while the clock enable signal is not active and that the functional circuits 22 draw significantly more current when the clock enable signal is active. When at t4 the 'clock start' signal is applied to the counter 18 (FIG. 3(e)), the counter increments (FIG. 3(c)) and activates the loads in binary sequence. In the illustrative embodiment, each count or clock pulse increases current demand by 1/16th of full functional load. At t5, the loads begin to draw current (FIG. 3(f)) until a maximum desired current threshold is reached at t6. Note the increase in current drawn from the power supply 14 in FIG. 3(h).

At t7, when the counter goes from 15 to 16 (01111 to 10000), the 'chip clock enable' signal goes high (FIG. 3(d)), the chip functional circuits 22 draw current (FIG. 3(g)) and all dummy loads shut down (FIG. 3(f)). Current demand goes from 15/16ths of full functional demand to 16/16ths. At this point, the total power supply current is at a maximum value as shown in FIG. 3(h). The power supply current stays high until the 'clock start' signal goes low at t9 and the counter 18 counts down to zero at t10 (FIG. 3(c)).

When the counter starts counting down, the 'chip clock enable signal' goes low (FIG. 3(d)) and the chip is shut down. During this time, the dummy loads draw current as depicted in FIG. 3(f) and minimal current is drawn by the chip 22 (FIG. 3(g)). Next, the dummy loads are shut down t12. Note, that the rising and trailing edges of the current drawn from the power supply are smooth. Hence, transient generation is mitigated.

It should be noted that a larger counter will produce smaller transients at the chip. Also, feeding the counter with a slower clock will produce smaller transients at the power supply.

Thus, the present invention has been described herein with reference to a particular embodiment for a particular application. Those having ordinary skill in the art and access to the present teachings will recognize additional modifications applications and embodiments within the scope thereof. For example, those skilled in the art will appreciate that other arrangements may be employed for effecting a gradual draw of power from the power supply without departing from the scope of the present teachings.

It is therefore intended by the appended claims to cover any and all such applications, modifications and embodiments within the scope of the present invention.

Accordingly,

What is claimed is:

1. A system for controlling the application of power by a power supply to a load circuit in response to a startup event, the system comprising:

a digitally controlled variable resistance coupled to the power supply for drawing power from the power supply;

control circuitry coupled to the digitally controlled variable resistance for controlling the amount of power drawn by the digitally controlled variable resistance from the power supply in response to the startup event; and enabling circuitry coupled to the control circuitry and to the load circuit, the enabling circuitry responsive to the control circuitry for selectively activating the load circuit wherein the load circuit draws power from the power supply, so that activation of the load circuit in response to the startup event is delayed.

2. The system of claim 1 wherein the enabling circuitry includes a gate having an output from the control circuitry as a first input and a clock signal as a second input and whereby the gate provides a clock input to the load circuit.

3. The system of claim 1 wherein the control circuitry discontinues the draw of power from the power supply by the digitally controlled variable resistance on the activation of the load circuit.

4. The system of claim 1 wherein the control circuitry includes a counter for supplying digital control values to the digitally controlled variable resistance, wherein the digital control values vary the amount of power demanded from the power supply by the digitally controlled variable resistance.

5. The system of claim 4 wherein the control circuitry gradually increases the amount of power drawn from the power supply by the digitally controlled variable resistance.

6. The system of claim 5 wherein the control circuitry gradually decreases the amount of power drawn from the power supply by the digitally controlled variable resistance.

7. A system for controlling the application of power by a power supply to a load circuit in response to a startup event, the system comprising:

a digitally controlled variable resistance coupled to the power supply for drawing power from the power supply;

control circuitry coupled to the digitally controlled variable resistance for controlling the amount of power drawn by the digitally controlled variable resistance from the power supply, the control circuitry including a binary counter for providing digital control words for the digitally controlled variable resistance in response to the startup event; and enabling circuitry coupled to the control circuitry and to the load circuit, the enabling circuitry responsive to the control circuitry for delaying activation the load circuit until the digital control words reach a predetermined value.

8. The system of claim 7 wherein the enabling circuitry includes a gate having an output from the counter as a first input and a clock signal as a second input and whereby the gate provides a clock input to the load circuit.

9. The system of claim 8 wherein the digital control words vary the amount of power demanded from the power supply by the digitally controlled variable resistance.

10. The system of claim 9 wherein the control circuitry gradually increases the amount of power demanded from the power supply by the digitally controlled variable resistance.

11. The system of claim 10 wherein the control circuitry gradually decreases the amount of power demanded from the power supply by the digitally controlled variable resistance.

* * * * *

UNITED STATES PATENT AND TRADEMARK OFFICE
CERTIFICATE OF CORRECTION

PATENT NO. : 5,646,572

DATED : July 8, 1997

INVENTOR(S) : Masleid

It is certified that error appears in the above-identified patent and that said Letters Patent is hereby corrected as shown below:

Column 4, Line 10: "circuity" should read "circuitry"

Signed and Sealed this

Twenty-second Day of June, 1999

Q. TODD DICKINSON

Attest:

Attesting Officer

Acting Commissioner of Patents and Trademarks